United States Patent [19]
Friberg et al.

[11] 4,234,437
[45] Nov. 18, 1980

[54] SUSPENSION OF SOLID PARTICLES IN A LIQUID

[75] Inventors: Stig E. Friberg; Kelvin Roberts, both of Saltsjö-Boo, Sweden

[73] Assignee: Arbman Development AB, Stockholm, Sweden

[21] Appl. No.: 535,709

[22] Filed: Dec. 23, 1974

Related U.S. Application Data

[63] Continuation-in-part of Ser. No. 490,695, Jul. 22, 1974, abandoned, which is a continuation of Ser. No. 238,514, Mar. 27, 1972, abandoned.

[30] Foreign Application Priority Data

Mar. 30, 1971 [SE] Sweden ............................ 4136/71

[51] Int. Cl.$^3$ ........................... C09D 5/02; H01F 1/28
[52] U.S. Cl. ................... 252/62.51; 252/299; 252/408
[58] Field of Search ............... 252/62.51, 62.52, 62.56, 252/299, 408 LC, 351, DIG. 15; 478/1

[56] References Cited

U.S. PATENT DOCUMENTS

| | | | |
|---|---|---|---|
| 2,423,144 | 7/1947 | Gregg | 252/351 X |
| 3,635,819 | 1/1972 | Kaiser | 252/62.52 X |
| 3,700,595 | 10/1972 | Kaiser | 252/62.51 X |

FOREIGN PATENT DOCUMENTS 632149  11/1949  United Kingdom .

OTHER PUBLICATIONS

Hyde, A. J., et al.; "Soap & Water & Amphiphile Systems"; *Discussions of the Faraday Society: The Physical Chemistry of Proteins* p. 239, (1953).
Mandell, L., et al.; The Three Component System Sodium Caprylate–Decanol–Water II, Royal Swedish Academy of Engineering Sciences (1967).
Fontell, K., et al.; The Three Component System Sodium Caprylate–Decanol–Water III, Royal Swedish Academy of Engineering Sciences (1967).
Lawson, K. D., et al.; *Journal of the American Chemical Society*, (10/67), vol. 89, pp. 5489–5491.
Ostwald, W.; Zeitschrift fuer Kristallographie.; vol. 79 (1931), pp. 222, 226, 227, 239; with translation.
Brown, G. H.; "The Mesomorphic State–Liquid Crystals" *Chemical Reviews;* vol. 57, No. 6, (Dec. 1957), pp. 1135–1141.
O'hern; et al., "I.B.M. Technical Disclosure Bulletin", vol. 13, No. 8, Jan. 1971, p. 2265.
Mandell; "Chemical Abstracts", vol. 66, 1967.
Wheelock, C. E.; "I.B.M. Technical Disclosure Bulletin", vol. 13; No. 8, Jan. 1971, p. 2266.

*Primary Examiner*—L. Dewayne Rutledge
*Assistant Examiner*—Michael L. Lewis
*Attorney, Agent, or Firm*—Toren, McGeady and Stanger

[57] ABSTRACT

A suspension of solid particles in an organic or aqueous liquid comprises a lyotropic liquid crystal as suspension stabilizer.

7 Claims, 3 Drawing Figures

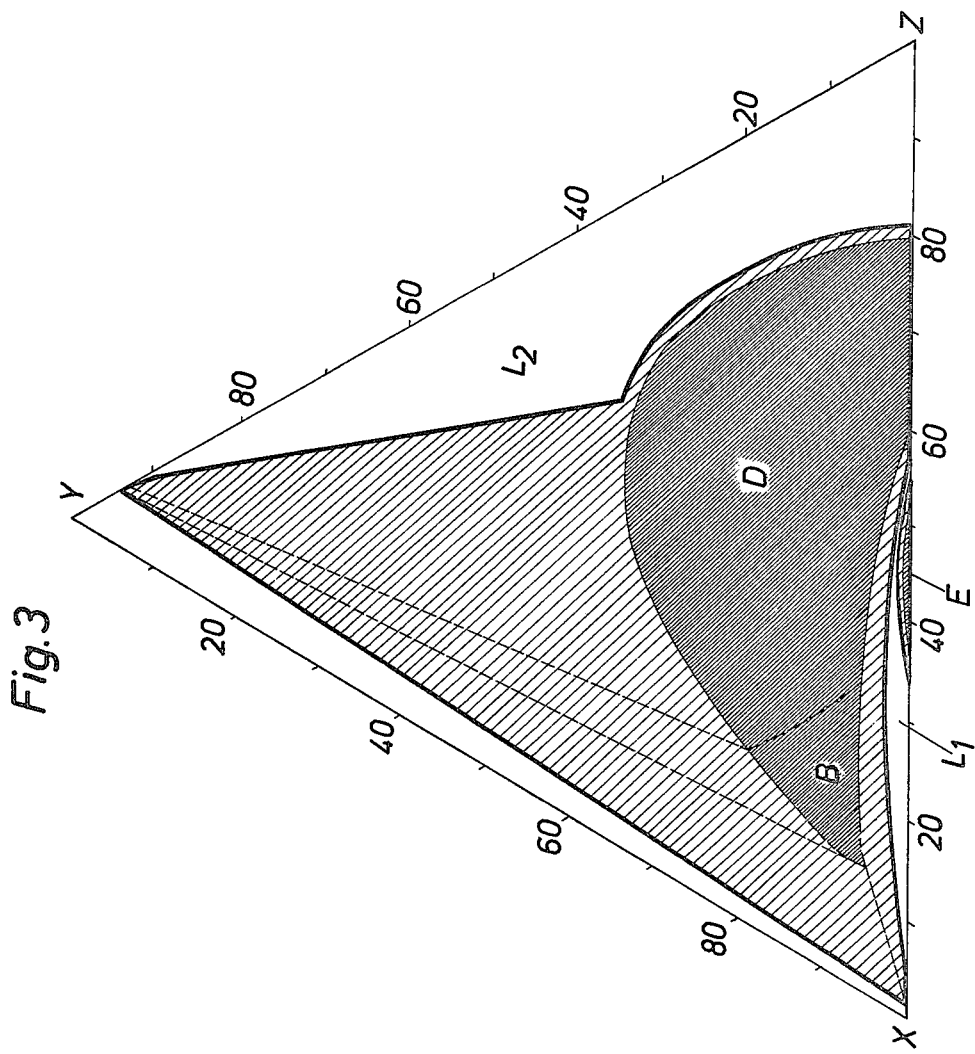

SUSPENSION OF SOLID PARTICLES IN A LIQUID

CROSS REFERENCE TO PRIOR APPLICATION

This is a Continuation-In-Part of application Ser. No. 490,695 filed July 22, 1974 which, in turn, was a continuation of Ser. No. 238,514 filed Mar. 27, 1972 and both now abandoned.

FIELD OF INVENTION

The invention is directed to the stabilization of suspensions of solid particles in liquids.

BACKGROUND INFORMATION AND PRIOR ART

Suspensions of solid particles in liquids have considerable industrial importance and are utilized for different purposes to an ever increasing extent. One area in which such suspensions are used is the manufacture of sanitary goods, such as for example hand basins and WC pedestals. Such products are customarily manufactured by introducing a clay suspension into a mold which is fitted with porous walls. Water is absorbed by the walls of the mold and the clay, in this manner, forms a deposit or layer on the walls, whereupon the clay article is dried and fired. Another area of application for suspensions of solid particles in liquids is in the paper industry in which kaolin or other substances of small particle size are added to the pulp or to the paper sheet as fillers or coatings to impart the paper with a smooth surface. Still another field of application is in the paint industry in which certain paint compositions contain color pigments and colloidal organic binders suspended in an aqueous phase. Suspensions of solid particles in liquid are also used in the manufacture of so-called magnetic liquids, to wit, liquids which contain small magnetic particles and which behave as if they were homogeneous and magnetic. More recently suspensions of the indicated kind have been used in the electrical and electronic industries. The present invention is applicable to all fields of utilization for such suspensions of solid particles in liquids.

It has previously been suggested to utilize thermotropic liquid crystals in the manufacture of stable suspensions of solid particles. Thus, for example, J. Rault et al, *Physics Letters*, Vol. 32A, No. 3 of June 29, 1970, discuss suspensions of magnetic particles in thermotropic crystals. The suspending effect of thermotropic crystals is based on the high viscosity of such crystals whereby relatively stable suspensions of solid particles can be obtained. In other words, the mechanism of suspension which is involved is an increased Stokes viscosity and reduced sedimentation rate.

SUMMARY OF THE INVENTION

It is a primary object of the present invention to provide suspensions of solid particles in liquids which are extremely stable—to wit the sedimentation rate of the particles is low—without unduly increasing the viscosity of the system.

Still another object of the invention is to produce a stable suspension of solid particles which can be easily transformed to an unstable condition with high sedimentation rate of the solid particles.

The conversion between the stable and unstable states should preferably be reversible, so that it is possible, with small changes of the composition of the suspension, to cycle several times between stable and unstable states.

Generally it is an object of the invention to improve on the art of suspensions of solid particles in liquids as presently practiced.

Briefly and in accordance with the invention it has surprisingly been found that a suspension of solid particles in a liquid is superiorly stabilized by adding to the suspension system a stabilizer in the form of a lyotropic liquid crystal. It is noted that, while the generic term "liquid crystals" is generally subdivided in two classes, to wit, thermotropic liquid crystals and lyotropic liquid crystals, these two classes, both from a chemical and physical point of view are not closely related.

Considered from a generic point of view, a liquid crystal is a state of matter in which the molecular order is neither three-dimensional, as in crystalline solids, nor zero-dimensional. This means that in a liquid crystal, the molecules are ordered in one or two perpendicular directions, but not in all three. Turning now to the two classes of liquid crystals the following distinctions should be observed:

Thermotropic liquid crystals are chemical compounds which give rise to a liquid crystalline phase on heating. The liquid crystalline phase exists over a certain temperature range, and can be formed by heating a single, pure chemical compound. The purity of the compound is essential. The types of thermotropic liquid crystalline phase which can be formed are termed nematic, cholesteric (or twisted nematic) and smectic. These different types of phase have different molecular orders. For example, the cholesteric liquid crystals have a spiral order in the liquid, and thereby function as diffraction grating and show colors. The pitch of the spiral is temperature dependent, so cholesteric liquid crystals can be used as temperature indicator, since they change color with temperature.

The nematic and smectic phases in certain modifications change orientation of the molecules in the liquid crystalline phase under applied electric fields. This allows nematic and smectic liquid crystals to be used as optical switches, and display devices based on this are commercially available.

Neither the temperature-indicating properties of cholesteric liquid crystals or the electro-optic properties of nematic and smectic liquid crystals are displayed by the lyotropic liquid crystals. Thermotropic liquid crystalline phases are very sensitive to oxidation, moisture, UV-light, and the presence of impurities, each of which can cause the conversion of the liquid crystalline phase to a crystalline state or to an isotropic liquid. Thermotropic liquid crystalline phases do not contain water. For technological applications of thermotropic liquid crystals in display systems of various types it is necessary that the liquid crystalline materials are microencapsulated or hermetically sealed in an air-free and water-free container. Any impurity will negate the desired effect after a short period.

By contrast, lyotropic liquid crystals are formed spontaneously without heating when a surface active amphiphilic substance is mixed with water at suitable concentrations. A non-surface active amphiphilic substance may also be present. The concentration region over which a lyotropic liquid crystalline phase exists for a given surface active amphiphilic substance depends on the relative size of the hydrocarbon (lyophilic) part of the molecule of the surface active amphiphilic substance relative to the polarity of the hydrophilic part. Lyotropic liquid crystals exist in lamellar, hexagonal, reversed hexagonal and isotropic forms. All of the structures formed contain water. By contrast, thermotropic liquid crystals do not contain water in the structure. It follows that it is not possible to mix thermotropic and lyotropic liquid crystals in a single system. Further, the lyotropic liquid crystal structures are not sensitive to light, UV, or moisture while the thermotropic liquid crystals are. The structures of lyotropic liquid crystalline phases are thus significantly different from those of thermotropic liquid crystalline phases.

Lyotropic liquid crystalline phases are capable of dissolving amphiphilic molecules or pure organic molecules (e.g. octane, p-xylene, hexadecane) which are then partly incorporated into the lyotropic liquid crystalline phase (see examples below). Because of this, lyotropic liquid crystalline phases can exist in contact with and in thermodynamic equilibrium with an aqueous or organic phase. In the following examples, a wide range of different organic liquids is given as the third component after water and surface active amphiphilic substance. For literature on liquid crystals reference is had to *A Review of the Structure and Physical Properties of Liquid Crystals*, Chemical Rubber Co., Brown G et al, Butterworth, London, 1971; *Molecular Structure and the Properties of Liquid Crystals*, Grey, Academic Press, 1962. L. Mandell and P. Ekwall: *Acta Polytechnica Scandinavica*, Ch. 74 I (1968); L. Mandell, K. Fontell, H. Lehtinen and P. Ekwall: *Acta Polytechnica Scandinavica*, Ch. 74 II (1968); K. Fontell, L. Mandell, H. Lehtinen and P. Ekwall: *Acta Polytechnica Scandinavica*, Ch. 74 III (1968).

The term "amphiphilic substance" as used hereinabove is further elucidated as follows:

Amphiphilic molecules consist of two regions or moieties A and B which are chemically bonded to each other to form the molecule AB. One region (A) is termed hydrophobic. This term indicates that this region of the molecule is not soluble in water but is soluble in oil. If, for example, region A of molecule AB is hydrophobic, then combining region A with a hydrogen atom will give a substance A-H, which is insoluble in water. For example, the octyl group $C_8H_{17}$— is hydrophobic. If this group is bonded to hydrogen the molecule n-octane, $C_8H_{18}$, is obtained, which is a hydrocarbon insoluble in water.

The second region of the molecule, to wit region B, is termed hydrophilic. This term indicates that region B interacts with water by polar interactions. If region B is combined with hydrogen to give B-H, a water-soluble substance is obtained.

The above definition is generic in that the precise chemical structure of the regions A and B is not determinative for the properties of amphiphilic substances. Group A can be, for example, octyl $C_8H_{17}$—, nonyl $C_9H_{19}$—, decyl $C_{10}H_{21}$—, undecyl $C_{11}H_{23}$—, dodecyl $C_{12}H_{25}$—, an unsaturated alkyl chain such as 9-octadecene $C_{18}H_{33}$—, or an aromatic group such as benzyl $C_6H_5$—, or toluyl $C_7H_7$—. The group can be sulfate —$SO_4^\ominus$, sulfonate —$SO_3^\ominus$, phosphate —$PO_3^{2-}$ polyphosphate, for example —$P_2O_7^{3-}$, carboxylate —$CO_2^\ominus$, amines of type $R_1R_1R_3N$, or quaternary salts of type $R_1R_2R_3R_4N^+$, where $R_1, R_2, R_3$ and $R_4$ are —H, an alkyl, aryl, or alkyl aryl group, or a polyethylene oxide monoglycol —$(CH_2CH_2O)_nH$, and at least one of the R groups is an alkyl, aryl or alkyl aryl group.

All combinations of groups of type A with groups of type B give rise to amphiphilic substances.

If the region B of the molecule AB is bonded so strongly to water that the whole molecule AB is water soluble, the amphiphilic molecule AB is said to be a surface active substance. A lyophilic liquid crystal must contain such a surface active amphiphilic substance, but its specific chemical composition is not critical for the purposes of this invention.

The distinction between amphiphilic substances which are surface active and those which are not can be quantified in the so-called HLB value (H.L.B=hydrophile-lyophile balance). See, e.g. *Emulsions-Theory and Practice*—Becher, Reinhold, 1965. In general, amphiphilic molecules with HLB values above 4 are surface active substances, or surfactants.

A few examples of amphiphilic molecules which are not surface active substances are:
n-pentanol
n-decanol
stearyl alcohol
oleyl alcohol
glyceryl distearate
glyceryl tristearate
glyceryl dilaurate
glycerol trilaurate
ethyl laurate
propyl laurate
n-octyl aldehyde
octanoic acid
decanoic acid
cholesterol
ethylene glycol
glycerol
n-octyl cyanide (capryl nitrile)
n-octylchloride
octane
abietic acid
octyl methyl ether
diethoxy oleyl alcohol
dioctylsuccinate
didodecyl fumarate
phenol
p-cresol
benzaldehyde
tridodecyl phosphate.

Any of these substances may be optionally contained in the stabilizer phase of this invention.

Examples of amphiphilic substances that are surface active agents are:
sodium caprylate
potassium stearate
lecithin
sodium octyl sulphate
sodiumlauryl sulphate
sodium octyl sulphonate
sodium lauryl sulphonate
sodium benzoate
sodium abietate
nonylphenyl hexacethyleneoxide monoglycol ether
sucrose monooleate
dodecyl polyphosphate
didodecyl phosphate
cetyl trimethyl ammonium bromide
glyceryl monostearate.

In accordance with the present invention, a suspension of solid particles thus comprises a stabilized system of:

(a) an organic or aqueous liquid serving as the suspension vehicle, (b) solid particles suspended in the liquid, and (c) a stabilizing agent which is a lyotropic liquid crystal.

Any type of lyotropic liquid crystal is suitable for the inventive purposes. The addition of such lyotropic liquid crystals to the suspension system significantly increases the stabilization of the system even if the amount is small.

The organic or aqueous liquid acts as the carrier or vehicle for the solid particles. Any type of organic or aqueous liquid suitable for suspending solid particles including water proper may be used.

In respect of the solid particles, again, any type of solid particle capable of being suspended in an organic or aqueous liquid can be employed. The larger the particles the more suspension agent, to wit lyotropic liquid crystal, will be added for stabilization purposes.

The presence of the lyotropic liquid crystalline phase in the system thus increases the stability of the suspension. The viscosity of the liquid, be it organic or aqueous, may be much lower than that of the liquid crystalline phase.

Without wanting to be limited to any theories, it is believed that the mechanism of stabilization caused by the presence of the lyotropic liquid crystalline phase is a reduction of the induced dipolar attractive forces between suspended particles due to a multilayer of the lyotropic liquid crystalline phase. The unaggregated particles are thereby held dispersed.

The mechanism of stabilization has to be clearly distinguished from that which has been disclosed in, for example, British Pat. No. 21170/45. This patent is concerned with the stabilization of an emulsion by an $\alpha$-crystalline form of a monoglyceride, i.e., solid crystals, not liquid crystals, are involved. This is clear from the fact that the patent specifies a fatty acid of a melting point above room temperature. The cetyl alcohol employed in the patent also has a setting point above 40° C. Glyceryl monostearate has a setting point well above room temperature, and forms $\alpha$-crystals on cooling at 47° C. (See e.g., D. Chapman, *Structures of Lipids*—Methuen 1965 pp 287–288). All these components are solid at room temperature, so it is clear that the stabilization of the emulsion occurs by using solid and not liquid crystals.

Some of systems shown to give rise to lyotropic liquid crystalline phases are shown below:

water-sodium caprylate-octanol
water-sodium caprylate-nonanol
water-sodium octylsulfate-decanol
water-nonylphenylpolyetheneoxide-hexadecane monoglycol ether
water-nonylphenylpolyetheneoxide-p-xylene monoglycol ether
water-nonylphenylpolyethyleneoxide-glyceryltrioleate
water-lecithin-sodium xylene sulfonate
water-monocaprylin-urea
water-lecithin-glycerol tricaprylate
water-potassium laurate-lauric acid
water-potassium oleate-decanol
water-aerosol OT-p-xylene
water-aerosol OT-decanol
water-aerosol OT-caproic acid
water-$C_{12}H_{25}O(C_2H_4O)_{10}H$-caprylic acid
water-glyceryl monocaprylate-glyceryl tricaprylate
water-lecithin-cholesterol
water-sodium caprylate-octane
water-sodium caprylate-p-xylene
water-octylamine-octanoic acid
water-$C_{12}H_{25}O(C_2H_4O)_{10}H$-oleic acid
water-sodium caprylate-methyl octanoate
water-sodium caprylate-caprylonitrile
water-sodium caprylate-caprylaldehyde
water-sodium caprylate-1-8 octanediol
water-octyl ammonium chloride-decanol
water-octyl trimethyl ammonium bromide-hexanol
water-octylamine-p-xylene
water-sodium caprylate-cholesterol
water-tetraethyleneglycol dodecyl ether-p-xylene
water-$C_{12}H_{25}O(C_2H_4O)_{10}H$-p-xylene
water-$C_{12}H_{25}O(C_2H_4O)_{10}H$-hexadecane In one embodiment of the invention, the lyotropic liquid crystal phase contains not only water and a surface active amphiphilic substance, but also an amphiphilic substance which is not surface active. Thus, superior stabilization effects are achieved if the suspension contains a mixture of water, a surface active amphiphilic substance and a non-surface active amphiphilic substance with a hydrocarbon chain of at least five carbon atoms, the proportion between the water, the surfactant and the non-surface active amphiphilic substance being such that a liquid crystalline phase is formed.

A factor to be considered in the stability of the suspension is, of course, the size and density of the solid particles. Relatively heavy particles, such as clay particles, can be held in stable suspension with particles of sizes up to a few microns. For clay suspensions a particle size of maximum 1 micron is, however, preferred. Material with a density which approaches that of water, such as plastics, can be held in a stable suspension with particles of somewhat larger size, for example 50 microns, and perhaps even up to 100 microns.

The surface active amphiphilic agent used can be anionic, for example a normal water-soluble metal soap. It can alternatively consist of a cation-active or a nonion active agent. Any of the substances listed herein and many others may be used. The non-surface active amphiphilic substance used may be, for example, a carboxylic acid, an alcohol, a monoglyceride, a phosphatide, an aldehyde, or alkyl glycol ether with less than three ether groups. The hydrocarbon chain can be straight or branched, saturated or unsaturated, and should contain at least five and preferably not more than twenty-five carbon atoms. Preferred lyotropic liquid crystal systems to be used in suspensions of the invention, some of which have been mentioned above, are:

water + sodium lauryl sulfate + decanol
water + sodium lauryl sulfate + octanol
water + sodium caprylate + octanol
water + sodium caprylate + decanol
water + sodium caprylate + octylamine
water + Berol EMU-09 + benzene
water + Berol EMU-09 + hexane Berol EMU-09 is a tradename for a nonyl-phenyl polyethyleneoxide monoglycol ether.

The proportions in which the components are to be mixed in order to form a liquid crystalline phase are known to a person skilled in the art. A few examples will be given with reference to the accompanying drawings.

FIG. 3 shows a ternary diagram illustrating another embodiment of the invention.

Figure 1:
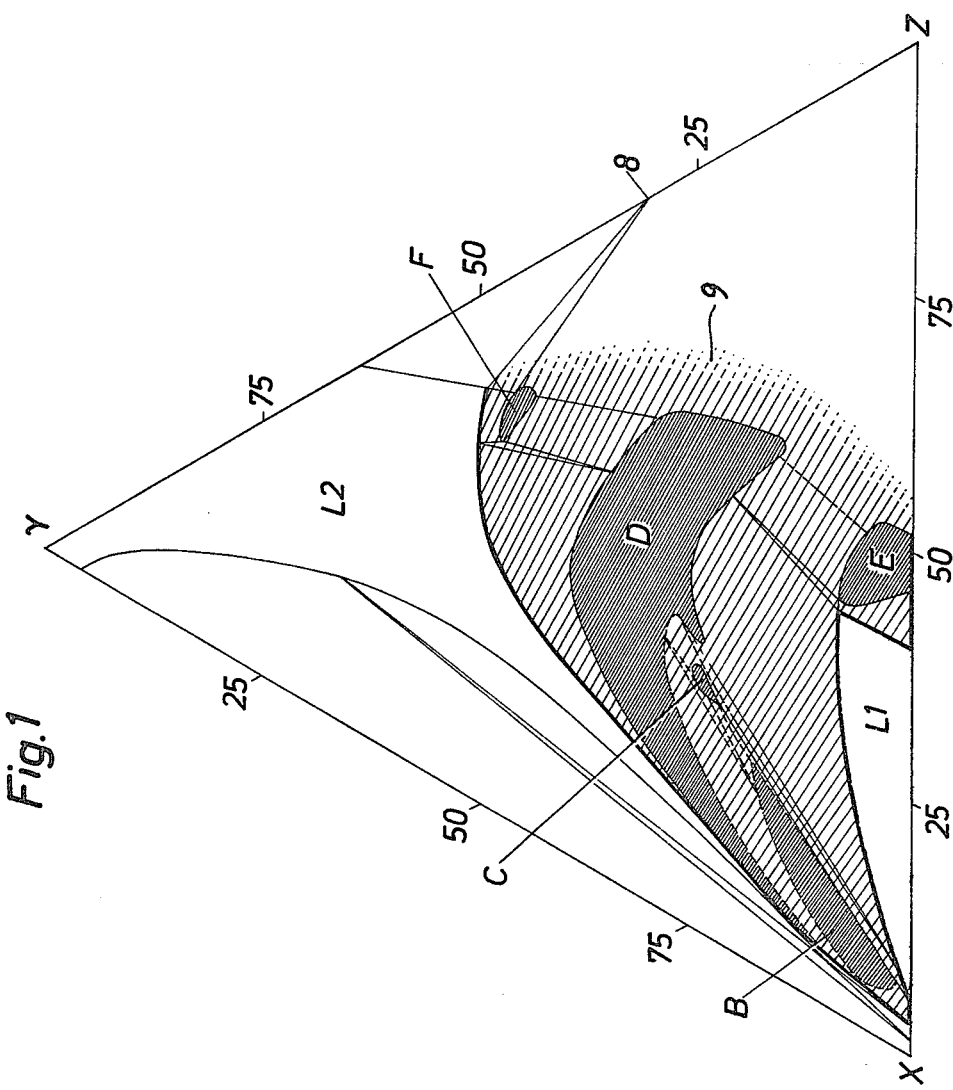
FIG. 1 shows a ternary diagram illustrating one embodiment of the invention.
Figure 2:
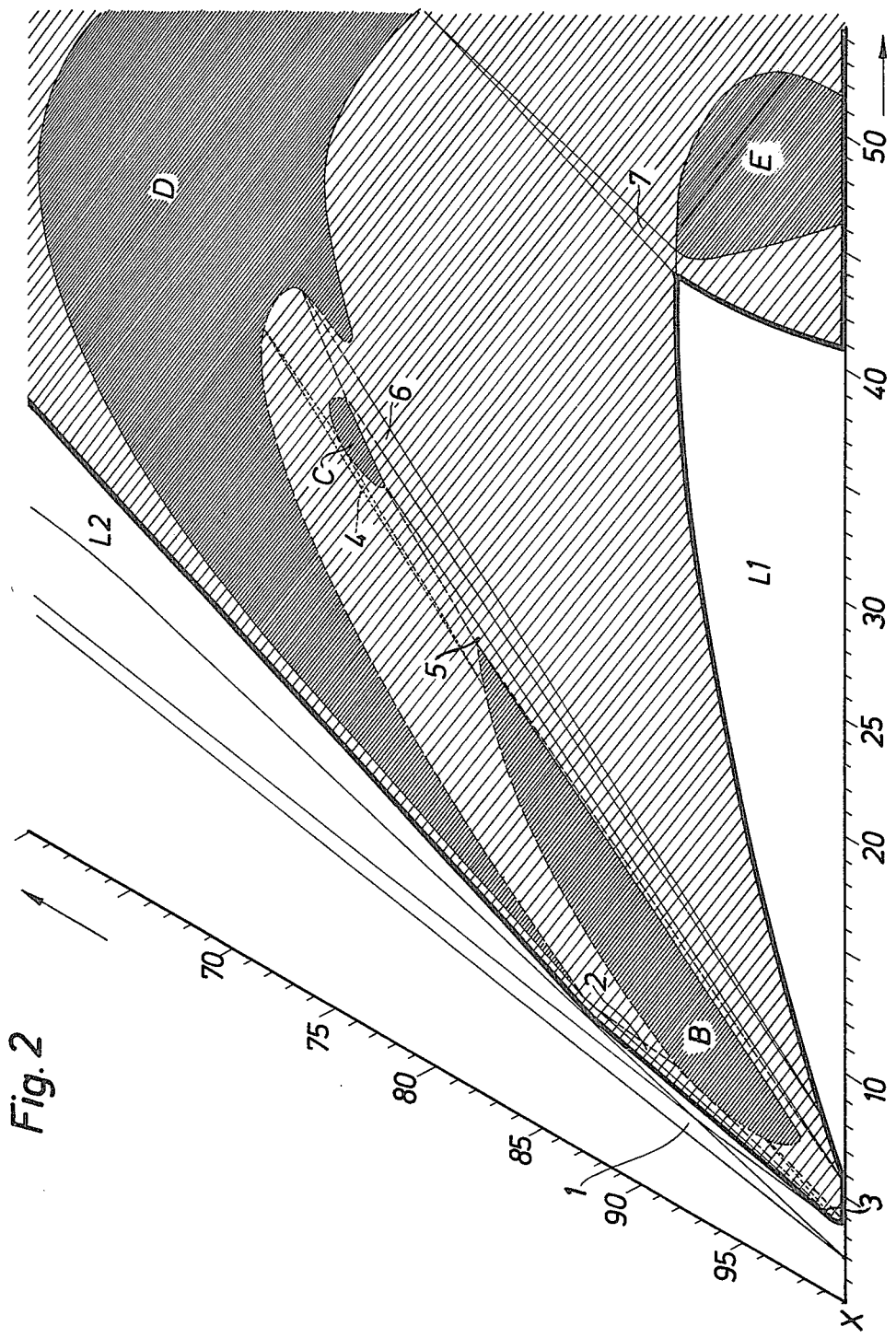
FIG. 2 shows a portion of the diagram of FIG. 1 on a larger scale.

In the ternary diagram of FIGS. 1 and 2 X represents water, Y represents caprylic acid, and Z represents sodium caprylate. In the diagram each and every one of the heavily hatched areas B, C, D, E and F consists of a liquid crystalline phase. In the lightly hatched area, liquid crystalline phases exist together with aqueous phases. The entire hatched area is useful for the invention. The right-hand boundary 9 of the hatched area has not been exactly ascertained. The boundary 9 illustrated in FIG. 1 corresponds to a composition containing approximately 50% sodium caprylate. A composition having such a high percentage of sodium caprylate has an extremely high viscosity. Therefore, it is preferred to use compositions having a lower percentage of sodium caprylate. In fact, it is usually preferred to use compositions containing more than 50% of water, and for most purposes we prefer to use compositions containing more than 80% of water. The areas $L_1$ and $L_2$ represent micellar solutions which are not liquid crystalline phases. It has been found that a composition within the hatched area not only results in increased suspension stability, but also results in a lower viscosity of the suspension.

Further, it has been found that the properties of the suspension are drastically changed at the boundaries of those areas where a liquid crystalline phase is obtained. This means that one can obtain a stable suspension by choosing a composition just inside the boundary, and that one can bring the supension to an unstable condition through a very small addition of one of the components which make up the stabilizing agent, viz. only so small an addition that the composition falls just outside the boundary. In this unstable condition the solid particles can easily be separated from the liquid phase. Only small amounts of the surface active agent and the amphiphilic substance then adhere firmly to the solid particles.

On the other hand, an unstable suspension in which the composition of the stabilizing medium lies just outside the boundary for an area where a liquid crystalline phase is formed, can be brought to a stable condition by an appropriate addition, sufficiently small so that the composition will fall just inside the boundary.

The areas 1–7 in FIG. 2 represent compositions containing three phases. The point 8 in FIG. 1 represents the composition Y.2Z.

In the ternary diagram of FIG. 3 X represents water, Y represents p-xylene, and Z represents an alkyl glycol ether sold by the Swedish company Berol under the trade name EMU-09. The heavily hatched areas B, D and E consist of liquid crystalline phases, and the lightly hatched areas contain liquid crystalline phases. All hatched areas are useful for the invention. The mixtures represented by FIG. 3 are particularly useful for the manufacture of magnetic liquids. For magnetic liquids we prefer to use a magnetic material, such as $Fe_3O_4$, in a quantity of 300–450 grams per liter. It has been found possible to make a suspension containing $Fe_3O_4$ in a quantity of up to 500 grams per liter.

EXAMPLES

1. A suspension is made by shaking 1 g of kaolin with 94.5 g of water. After the suspension has been shaken the pH is adjusted to 7 by addition of a few drops of 0.1 M sodium hydroxide. This suspension is unstable and sediments within a few minutes. Addition of 4.5 g sodium caprylate produces no marked difference in the stability of the suspension.

If 1 g of caprylic acid is added with shaking, a suspension results which is stable for several days. If the acid addition is increased to 2% the stability increases somewhat.

Similar changes in suspension stability are observed if plastic balls of a size of between 5 and 50 microns are used instead of kaolin particles.

2. In a similar way, 1 g of kaolin is shaken with 91 g of water and pH is adjusted to 7. An unstable suspension is obtained. The suspension remains unstable when 7% sodium caprylate is added to it. When 2% caprylic acid is subsequently added and the mixture is shaken, a stable suspension is obtained.

3. 1 g of kaolin is added to 61 g of water at pH 7, and 30 g sodium caprylate is added. An unstable suspension is obtained. 9 g of caprylic acid is now added and the mixture is shaken. A stable suspension is now obtained.

4. 40 g kaolin is added to 91 g of water, the pH is adjusted to 7, and the suspension is shaken. This suspension has very high viscosity. 4.5 g sodium caprylate is now added, resulting in a reduction of the viscosity of the suspension. 1% caprylic acid is now added to the suspension. A further reduction of the viscosity is now obtained to approximately one fourth of that which was obtained after the addition of sodium caprylate.

5. Liquid mixtures were prepared by mixing p-xylene with EMU-09 and water in the following ratios (by weight):

| p-xylene | EMU-09 | Water |
| --- | --- | --- |
| 70 | 18 | 12 |
| 75 | 15 | 10 |
| 80 | 12 | 8 |

$Fe_3O_4$ having a particle size of 1–5 microns was added to these three mixtures in a quantity of 100 grams per liter. The suspensions were milled in a colloid mill for 15 minutes. The resulting suspensions had a particle size of 0.1–0.5 micron, had an extremely good stability, and were useful as magnetic liquids.

Further examples of suspensions stabilized by liquid crystalline phases:

6. 30% of colloidal silica (5 u diameter) added to an aqueous system of composition 85% water, 10% EMU-02, 5% p-xylene. (EMU-02 is an alkyl polyethyleneoxide monoglycol ether.)

7. 10 wt % polystyrene in the form of spheres, 0.1 mm diameter, in an aqueous solution of composition 50% water, 35% EMU-09, 15% hexadecane.

8. 10 wt % polystyrene in the form of spheres, 0.1 mm diameter in an organic solution of composition 18% water, 12% EMU-09, 70% hexadecane.

We claim:

1. In a suspension of solid particles in an organic or aqueous liquid and a stabilizing agent, the improvement which comprises said stabilizing agent being a lyotropic liquid crystal.

2. A suspension as claimed in claim 1, wherein said lyotropic liquid crystal contains at least one amphiphilic substance which is a surface active agent.

3. A suspension as claimed in claim 2 wherein said lyotropic liquid crystal contains a second amphiphilic substance which is not a surface active agent.

4. A suspension as claimed in claim 6 wherein said solid particles are magnetic particles having a size of less than 1 micron.

5. A suspension as claimed in claim 4 wherein the system contains magnetic partices in a quantity of 300 to 450 grams per liter of suspension.

6. In a suspension of solid particles in an organic or aqueous liquid and a stablizing agent, the improvement which comprises said liquid being a lyotropic liquid crystal phase consisting essentially of a surface active agent and an amphiphilic substance having a hydrocarbon chain of at least five carbon atoms and water.

7. A suspension as claimed in claim 6 wherein the liquid is an aqueous liquid containing more than 50% by weight of water.

* * * * *